United States Patent
Giannakopoulos et al.

(10) Patent No.: US 10,563,672 B2
(45) Date of Patent: Feb. 18, 2020

(54) GAS TURBINE ENGINE COMPRESSOR

(71) Applicant: United Technologies Corporation, Farmington, CT (US)

(72) Inventors: Konstantinos Panagiotis Giannakopoulos, Middletown, CT (US); William W. Frank, Cheshire, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 166 days.

(21) Appl. No.: 15/890,866

(22) Filed: Feb. 7, 2018

(65) Prior Publication Data

US 2019/0242407 A1 Aug. 8, 2019

(51) Int. Cl.
| | |
|---|---|
| *F04D 29/58* | (2006.01) |
| *F04D 29/10* | (2006.01) |
| *F04D 19/02* | (2006.01) |
| *F01D 5/08* | (2006.01) |
| *F02C 3/04* | (2006.01) |
| *F01D 25/12* | (2006.01) |

(52) U.S. Cl.
CPC .......... *F04D 29/584* (2013.01); *F01D 5/082* (2013.01); *F01D 5/085* (2013.01); *F04D 19/02* (2013.01); *F04D 29/102* (2013.01); *F01D 25/125* (2013.01); *F02C 3/04* (2013.01); *F05D 2220/323* (2013.01); *F05D 2240/20* (2013.01); *F05D 2260/205* (2013.01)

(58) Field of Classification Search
CPC . F01D 5/08; F01D 5/082; F01D 5/084; F01D 5/085; F01D 5/087; F01D 5/088; F01D 25/08; F01D 25/12; F02C 7/18; F04D 29/584
See application file for complete search history.

(56) References Cited

U.S. PATENT DOCUMENTS

| | | | | |
|---|---|---|---|---|
| 3,647,313 A | * | 3/1972 | Koff ................. | F01D 5/084 415/115 |
| 5,271,711 A | * | 12/1993 | McGreehan ........ | F01D 5/085 415/115 |
| 9,188,009 B2 | * | 11/2015 | Yilmaz ................ | F02C 7/12 |
| 9,234,463 B2 | * | 1/2016 | Benjamin ............ | F02C 7/12 |

(Continued)

FOREIGN PATENT DOCUMENTS

| | | |
|---|---|---|
| EP | 3018288 | 5/2016 |
| EP | 3045659 | 7/2016 |

(Continued)

OTHER PUBLICATIONS

EP Search Report for EP Application 19155832.9 Date completed Jul. 4, 2019.

Primary Examiner — Dwayne J White
Assistant Examiner — Jackson N Gillenwaters
(74) Attorney, Agent, or Firm — Carlson, Gaskey & Olds, P.C.

(57) ABSTRACT

A high pressure compressor rotor stack includes a bore basket that includes a bore basket internal passage. A first plurality of rotor stages at least partially defines a forward rotor bore with a forward hub structure and the bore basket. A second plurality of rotor stages at least partially defines an aft rotor bore with an aft hub structure and the bore basket.

20 Claims, 6 Drawing Sheets

(56) References Cited

U.S. PATENT DOCUMENTS

| | | |
|---|---|---|
| 9,816,963 B2 | 11/2017 | Vetters et al. |
| 2015/0240723 A1 | 8/2015 | Gons |
| 2016/0076379 A1* | 3/2016 | Forcier .................. F01D 5/081 416/1 |
| 2016/0123234 A1* | 5/2016 | Forcier .................. F01D 5/087 60/805 |

FOREIGN PATENT DOCUMENTS

| | | |
|---|---|---|
| FR | 2892148 | 4/2007 |
| WO | 20130162752 | 10/2013 |

\* cited by examiner

10,563,672 B2

GAS TURBINE ENGINE COMPRESSOR

STATEMENT REGARDING FEDERALLY SPONSORED RESEARCH OR DEVELOPMENT

This invention was made with government support under Contract No. FA8626-16-C-2139, awarded by the United States Air Force. The Government has certain rights in this invention.

BACKGROUND

A gas turbine engine typically includes a fan section, a compressor section, a combustor section, and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section.

As the air travels through the compressor section, a temperature of the air in the core flow path C increases in response to the work performed to elevate the pressure of that air. The increasing temperature of the air in the core flow path C warms the surrounding components in the compressor section causing those components to expand. This expansion can cause thermal mechanical fatigue in the components. Therefore, there is a need to improve thermal management in the compressor section to reduce thermal mechanical fatigue.

SUMMARY

In one exemplary embodiment, a high pressure compressor rotor stack includes a bore basket that includes a bore basket internal passage. A first plurality of rotor stages at least partially defines a forward rotor bore with a forward hub structure and the bore basket. A second plurality of rotor stages at least partially defines an aft rotor bore with an aft hub structure and the bore basket.

In a further embodiment of any of the above, a fluid inlet to the forward rotor bore extends through the forward hub structure.

In a further embodiment of any of the above, the bore internal passage includes an inlet downstream of an outlet.

In a further embodiment of any of the above, the outlet to the bore basket internal passage is in fluid communication with a fluid outlet extending through the forward hub structure. The fluid outlet in the forward hub structure is located radially inward and axially forward of the fluid inlet to the forward rotor bore.

In a further embodiment of any of the above, a fluid inlet to the aft rotor bore extends through the aft rotor structure. A fluid outlet to the aft rotor bore is located adjacent the second plurality of rotor stages.

In a further embodiment of any of the above, the fluid outlet to the aft rotor bore is located axially upstream and radially outward of the fluid inlet to the aft rotor bore.

In a further embodiment of any of the above, an anti-vortex cavity is located axially between the forward rotor bore and the aft rotor bore.

In a further embodiment of any of the above, an upstream end of the anti-vortex cavity is defined by one of the first plurality of rotor stages. A downstream end of the anti-vortex cavity is defined by one of the second plurality of rotor stages. A radially inner edge of the anti-vortex cavity is defined by a portion of the bore basket.

In a further embodiment of any of the above, a forward seal fluidly seals one of the first plurality of rotor stages to the bore basket, An aft seal fluidly seals one of the second plurality of rotor stages to the bore basket to fluidly separate the anti-vortex cavity from the forward rotor bore and the aft rotor bore.

In a further embodiment of any of the above, at least a portion of the forward hub structure includes a cone shape opening in a downstream direction. At least a portion of the aft hub structure includes a cone shape opening in an upstream direction.

In one exemplary embodiment, a gas turbine engine includes a turbine section. A compressor section is driven by the turbine section. The compressor section includes a high pressure compressor rotor stack that has a bore basket that includes a bore basket internal passage. A first plurality of rotor stages at least partially defines a forward rotor bore with a forward hub structure and the bore basket. A second plurality of rotor stages at least partially defines an aft rotor bore with an aft hub structure and the bore basket.

In a further embodiment of any of the above, a fluid inlet to the forward rotor bore extends through the forward hub structure. The fluid inlet is in fluid communication with a core flow path of the gas turbine engine.

In a further embodiment of any of the above, the bore internal passage includes an inlet downstream of an outlet. The outlet to the bore basket internal passage is in fluid communication with a fluid outlet and extends through the forward hub structure. The fluid outlet is in fluid communication with a bearing support cavity.

In a further embodiment of any of the above, a fluid inlet to the aft rotor bore extends through the aft rotor structure. A fluid outlet to the aft rotor bore is located adjacent the second plurality of rotor stages.

In a further embodiment of any of the above, an anti-vortex cavity is located axially between the forward rotor bore and the aft rotor bore. An upstream end of the anti-vortex cavity is defined by one of the first plurality of rotor stages. A downstream end of the anti-vortex cavity is defined by one of the second plurality of rotor stages. A radially inner edge of the anti-vortex cavity is defined by a portion of the bore basket.

In a further embodiment of any of the above, a forward seal fluidly seals one of the first plurality of rotor stages to the bore basket. An aft seal fluidly seals one of the second plurality of rotor stages to the bore basket to fluidly separate the anti-vortex cavity from the forward rotor bore and the aft rotor bore.

In another exemplary embodiment, a method of directing fluid through a high pressure turbine rotor stack includes the step of directing a first fluid through a forward rotor bore. A fluid inlet to the forward rotor bore extends through a forward hub structure and an outlet of the forward rotor bore is in fluid communication with a bearing compartment. A second fluid is directed through an anti-vortex cavity. A third fluid is directed through an aft rotor bore in an upstream direction.

In a further embodiment of any of the above, the method includes heating at least one forward rotor disk in the forward rotor bore with the first fluid entering the forward rotor bore. An amount of flow of the first fluid is controlled by varying a radial dimension between a radially inner end of the at least one rotor disk and a bore basket.

In a further embodiment of any of the above, the method includes conditioning at least one aft rotor disk in the aft rotor bore with the third fluid and controlling an amount of flow of the second fluid by varying a radial dimension between a radially inner end of the at least one aft rotor disk and the bore basket.

In a further embodiment of any of the above, the method includes fluidly isolating the forward rotor bore from the anti-vortex cavity with a forward seal engaging a bore basket. The aft rotor bore is fluidly isolated form the anti-vortex cavity with an aft seal engaging the bore basket.

DETAILED DESCRIPTION

Figure 1:
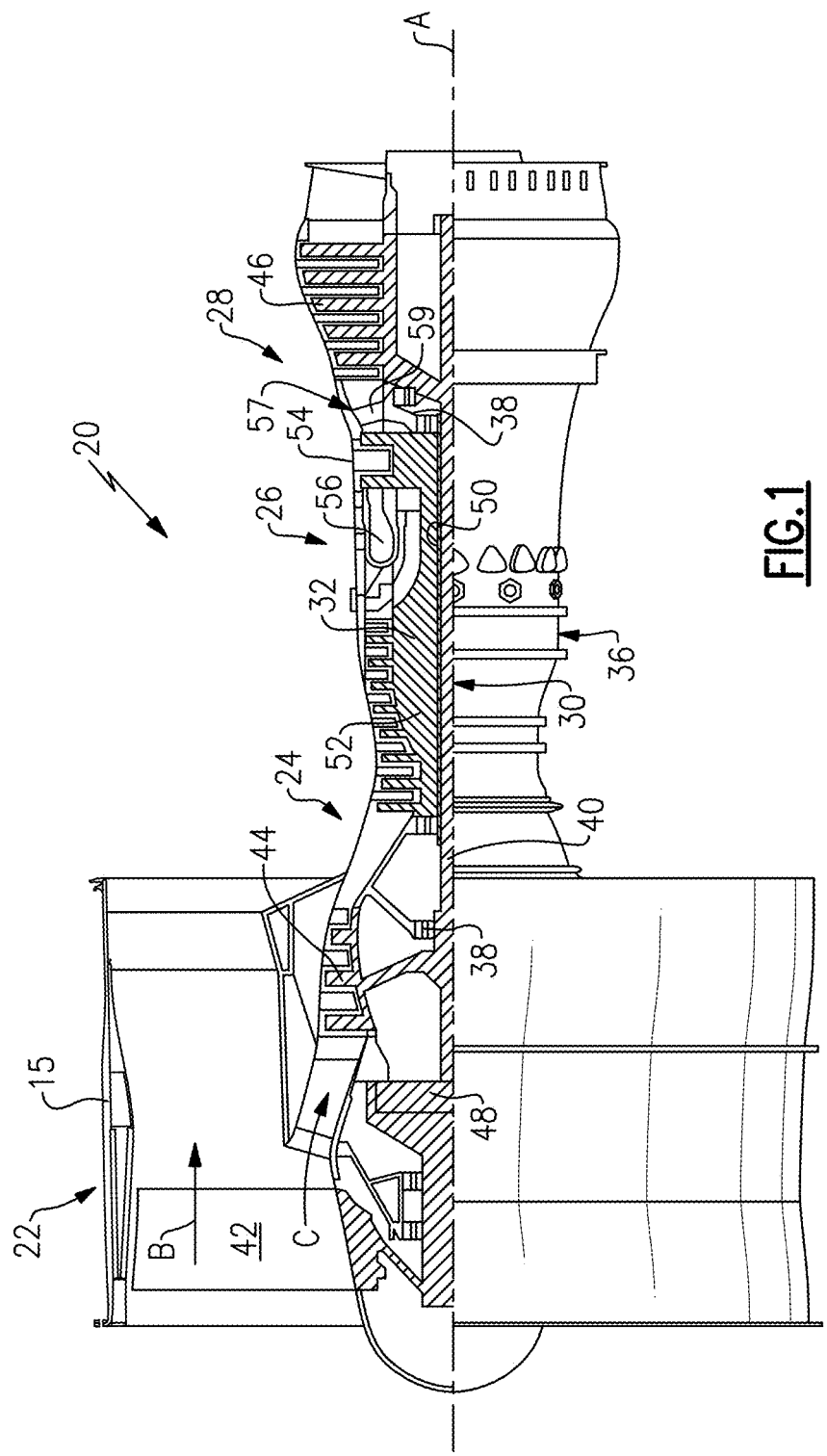
FIG. 1 is a schematic view of an example gas turbine engine according to a non-limiting example.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram °R)/(518.7°R)]^{0.5}$. The "Low corrected fan tip speed" as disclosed herein according to one non-limiting embodiment is less than about 1150 ft/second (350.5 meters/second).

Figure 2:
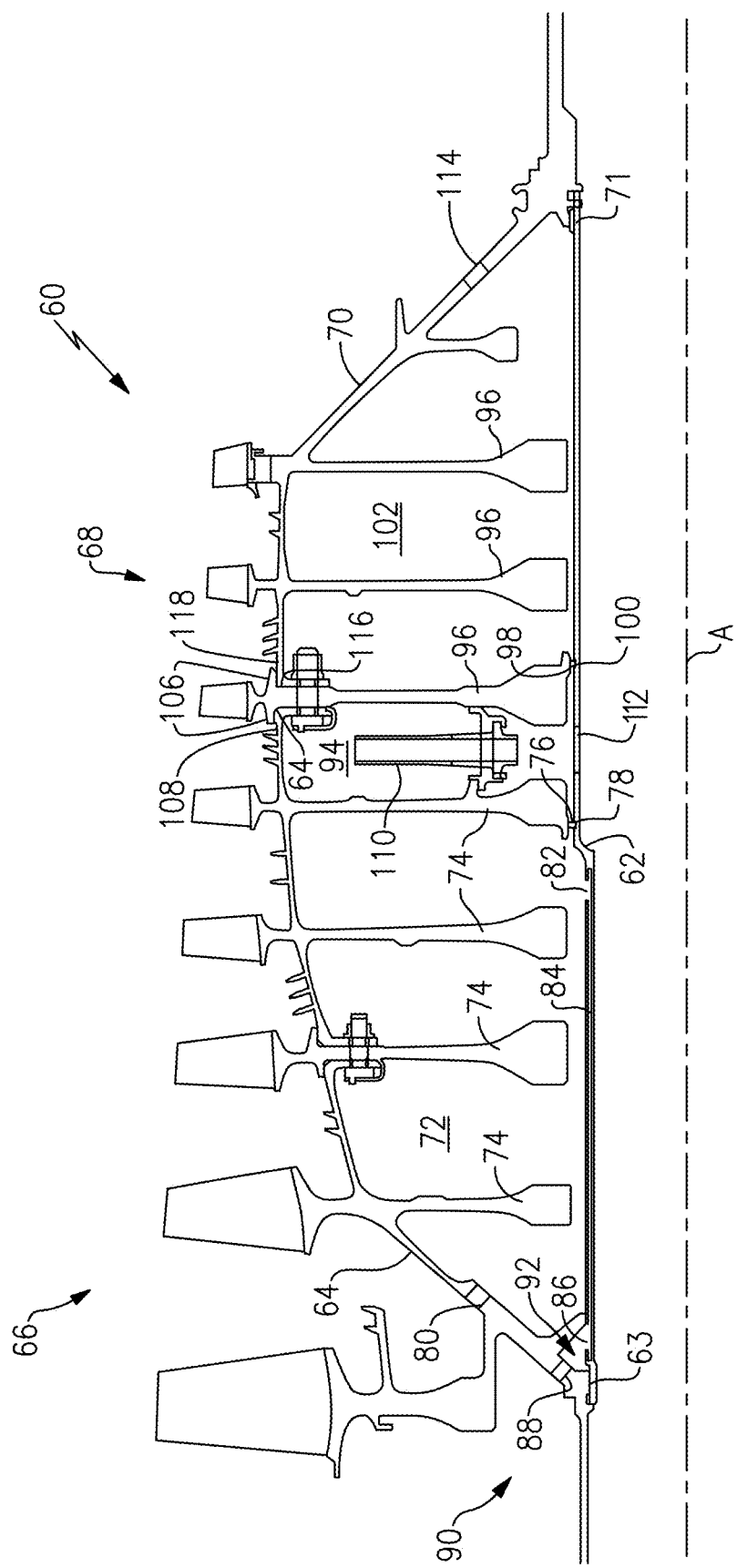
FIG. 2 illustrates an example high pressure compressor rotor stack.

FIG. 2 illustrates a high pressure compressor rotor stack 60 according to a non-limiting example of this disclosure. The rotor stack 60 is configured to rotate with the outer shaft 50 to compress the air traveling through the core flow path C. In the illustrated example, the rotor stack 60 includes a bore basket 62, a forward hub structure 64, a first plurality of rotor stages 66, a second plurality of rotor stages 68, and an aft hub structure 70.

Figure 3:
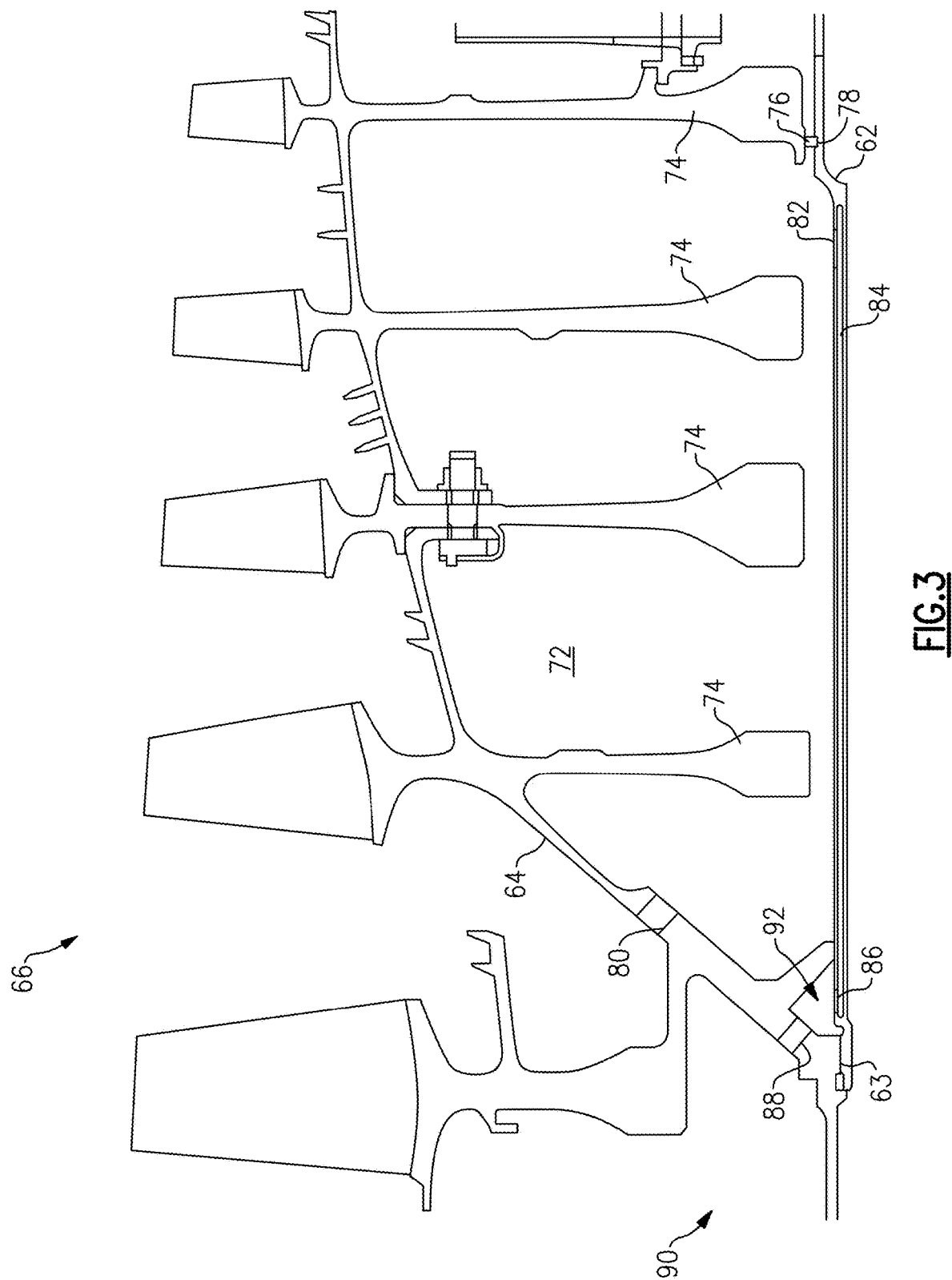
FIG. 3 illustrates an enlarged view of a forward portion of the high pressure compressor rotor stack of FIG. 2.

As shown in FIGS. 2 and 3, a forward rotor bore 72 is at least partially defined by the bore basket 62, the forward hub structure 64, and the first plurality of rotor stages 66. An axially forward end of the bore basket 62 is attached to the forward hub structure 64 with a threaded connection 63. The first plurality of rotor stages 66 include corresponding rotor disks 74 that extend into the forward rotor bore 72. A downstream stage of the plurality of rotor stages 66 is sealed relative to the bore basket 62 with a seal 76 extending between a radially inner end of the rotor disk and a groove 78 in the bore basket 62. In the illustrated non-limiting example, the seal 76 is a piston seal that extends circumferentially around the bore basket 62. However, other types of seals could be used in place of the piston seal.

Air from the core flow path C is bled into the forward rotor bore 72 through a forward bore inlet 80. The forward bore inlet 80 extends through a cone portion of the forward hub structure 64 and is downstream of at least one of the first plurality of rotor stages 66. The air entering the forward rotor bore 72 is elevated in temperature due to traveling through the low pressure compressor 44 and at least one stage of the high pressure compressor 52. The elevated temperature of the air entering the forward rotor bore 72 increases the temperature of the rotor disks 74 in the forward rotor bore 72. The increased temperature of the rotor disks 74 influences the thermal expansion of the rotor disks 74 and reduces the amount of thermal mechanical fatigue experiences by the rotor stack 60. The amount of air traveling through the forward rotor bore 72 is at least partially controlled by a radial dimension between the bore basket 62 and a radially inner end of the rotor disks 74, such that increase the radial dimension increases the amount of flow and decreasing the radial dimension decreases the amount of flow.

Once the air has entered the forward rotor bore 72, the air exits the forward rotor bore 72 through a bore basket inlet 82 in fluid communication with a bore basket passage 84. The amount of air traveling through the bore basket passage 84 is at least partially controlled by a radial dimension of the passage, such that increase the radial dimension increases the amount of flow and decreasing the radial dimension decreases the amount of flow. The bore basket passage 84 extends from the bore basket inlet 82 axially forward to a bore basket outlet 86. The bore basket outlet 86 is in fluid communication with an outlet 88 in the forward hub structure 64. The outlet 88 in the forward hub structure 64 is in fluid communication with a bearing compartment 90. In the illustrated non-limiting embodiment, air leaving the bore basket outlet 86 collects in an outlet cavity 92 defined by the forward hub structure 64 and a radially outer surface of the bore basket 62 prior to passing through the outlet 88 and into the bearing compartment 90.

Figure 4:
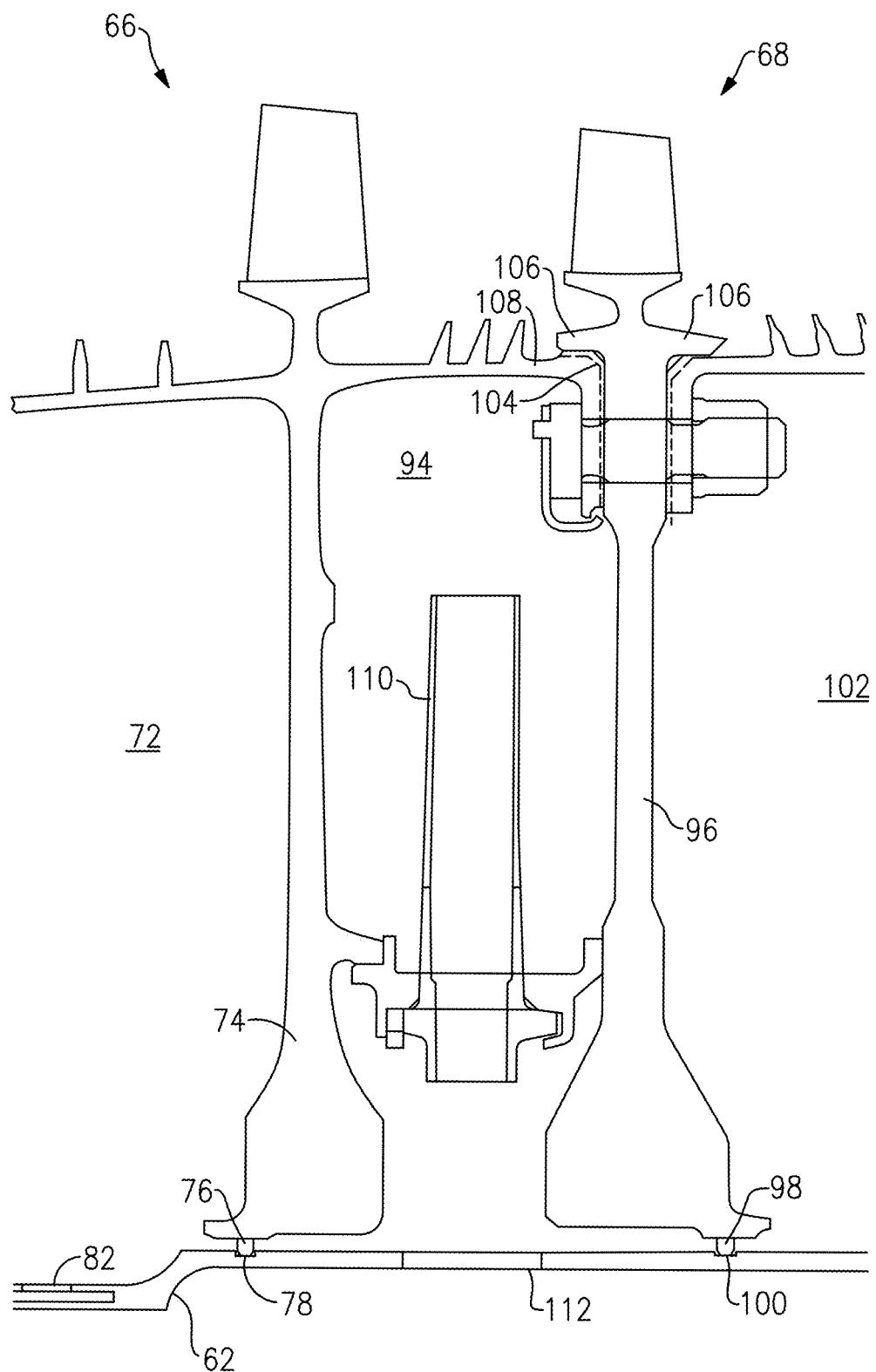
FIG. 4 illustrates an enlarged view of a mid-portion of the high pressure compressor rotor stack of FIG. 2.

FIG. 4 illustrates an enlarged view of an anti-vortex cavity 94. The anti-vortex cavity 94 is defined by a downstream most stage of the first plurality of rotor stages 66, an upstream most stage of the second plurality of rotor stages 68, and the bore basket 62. The anti-vortex cavity 94 is separated from the forward rotor bore cavity with the seal 76 and from an after rotor bore 102 by a seal 98 located in a groove 100 in the bore basket 62. In the illustrated non-limiting example, the seal 98 is a piston seal that extends circumferentially around the bore basket 62. However, other types of seals could be used in place of the piston seal.

Air is bled off of the core flow path C and enters the anti-vortex cavity 94 through a plurality of grooves 104 extending between a snap flange 106 on one of the second plurality of rotor stages 68 and a flange 108 on one of the first plurality of rotor stages 66. The grooves 104 can be located in at least one of the flange 108, the snap flange 106, or a portion of a rotor disk 96. A size of the grooves 104 can be varied depending on the amount of conditioning flow required through the anti-vortex cavity 94.

Once the air enters the anti-vortex cavity 94, the air travels through at least one anti-vortex tube 110, which de-swirls the flow of air and directs the air in the anti-vortex cavity 94 through an anti-vortex cavity outlet 112 in the bore basket 62. The air that has passed through the anti-vortex cavity outlet 112 can then travel axially downstream and be used in cooling the turbine section 28 due to the elevated pressure and relatively low temperature compared to an operating temperature of the turbine section 28.

Figure 5:
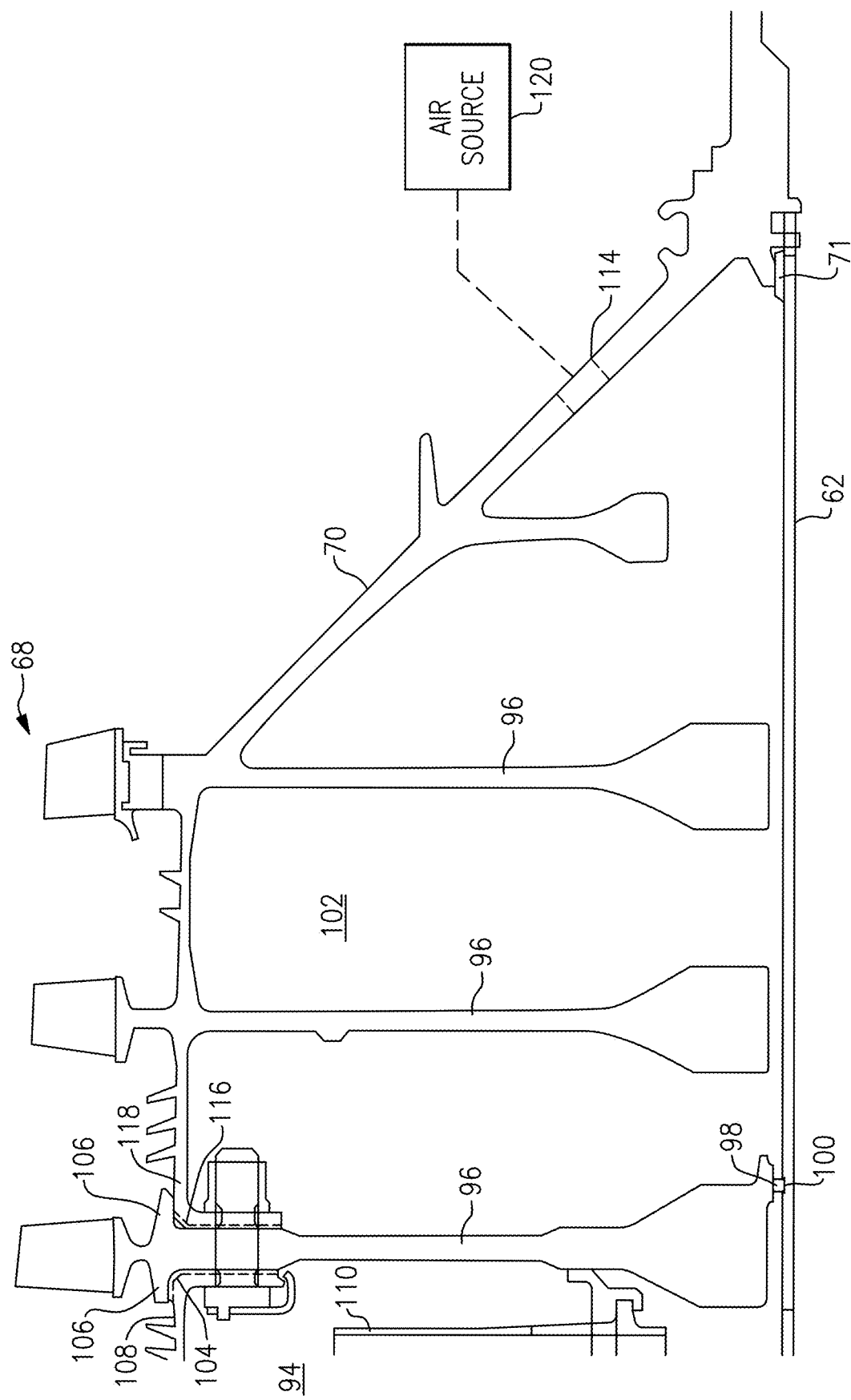
FIG. 5 illustrates an enlarged view of an aft portion of the high pressure compressor rotor stack of FIG. 2.

As shown in FIG. 5, the aft rotor bore 102 is at least partially defined by the second plurality of rotor stages 68, the aft hub structure 70, and the bore basket 62. The second plurality of rotor stages 68 include corresponding rotor disks 96 that extend into the aft rotor bore 102. An upstream stage of the second plurality of rotor stages 68 is sealed relative to the bore basket 62 with the seal 98 extending between a radially inner end of the rotor disk 96 and the groove 100 in the bore basket 62. The amount of air traveling through the aft rotor bore 102 is at least partially controlled by a radial dimension between the bore basket 62 and a radially inner end of the rotor disks 96, such that increase the radial dimension increases the amount of flow and decreasing the radial dimension decreases the amount of flow.

The bore basket 62 is secured to the aft hub structure 70 through a snap fitting 71 having at least one projection on the bore basket 62 that engages at least one tab on the aft hub structure 70. Also, as shown in FIGS. 2, 3, and 5, a radial dimension of the bore basket 62 adjacent the forward rotor bore 72 is smaller than a radial dimension of the bore basket 62 adjacent the anti-vortex cavity 94 and the aft rotor bore 102. In this disclosure, radial or radially and axial or axially is relative to the engine axis A unless stated otherwise.

Air from an air source 120, such as compressor bleed air, ram air, or conditioned air, enters the aft rotor bore 102 through an aft rotor bore inlet 114. The air travels axially forward past the rotor disks 96 to condition the rotor disks 96 to control the thermal expansion of the rotor disks 96. The air then travels radially outward through a plurality of grooves 116 into the core flow path C. The plurality of grooves 116 extend between the snap flange 106 and the rotor disk 96 on the upstream most stage of the second plurality of stages 68 and a flange 118 in the second plurality of rotor stages 68. In the illustrated example, the grooves 116 are located on at least one of the rotor disks 96, the snap flange 106, and the flange 118. A size of the grooves 116 can be varied depending on the amount of conditioning flow required through the aft rotor bore 102.

Figure 6:
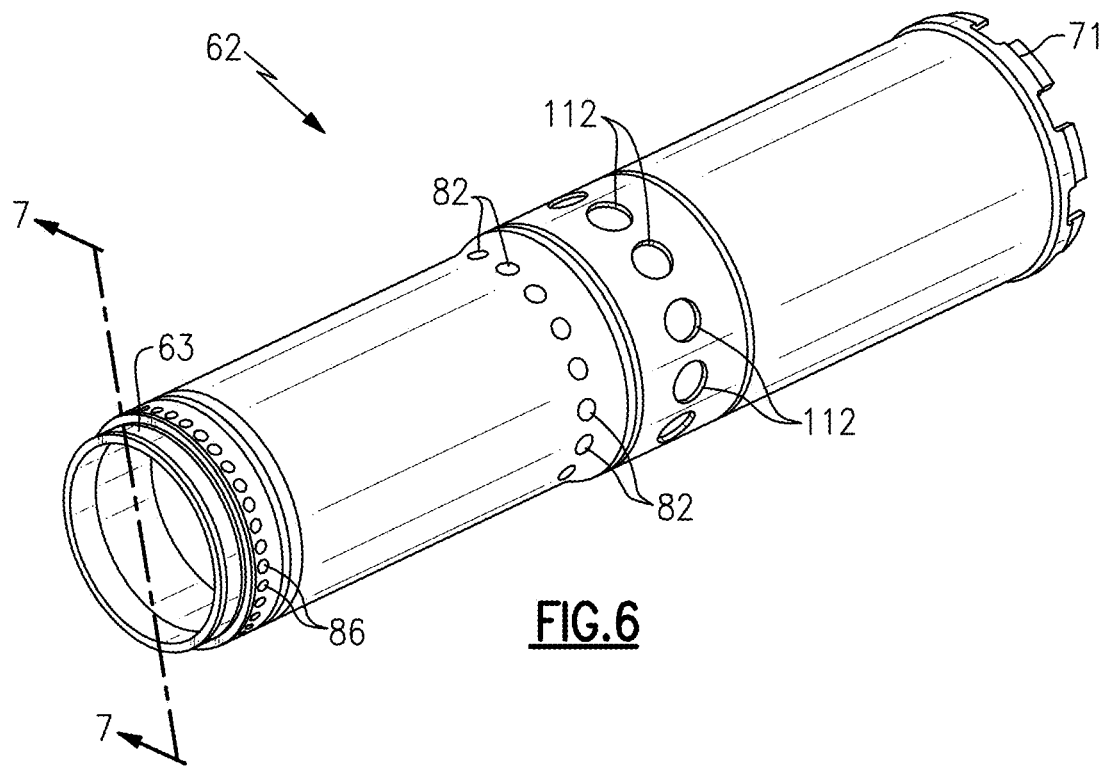
FIG. 6 illustrates a perspective view of an example bore basket according to a non-limiting example.
Figure 7:
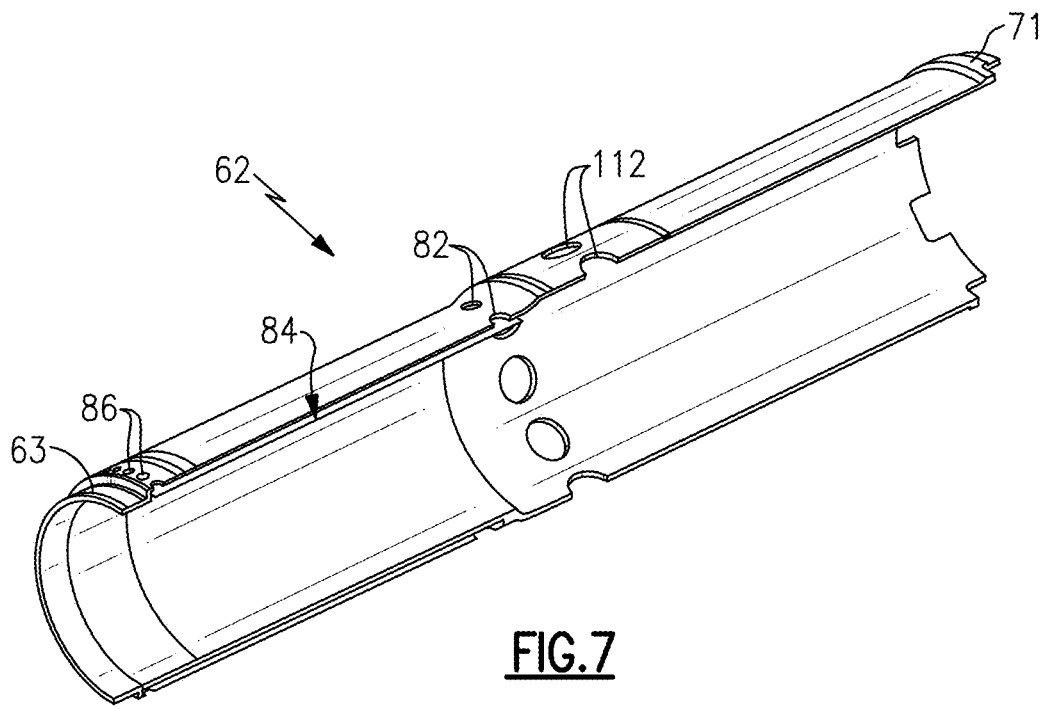
FIG. 7 illustrates a cross-sectional view taken along line 7-7 of FIG. 6.

As shown in FIGS. 6 and 7, the bore basket 62 includes a cylindrical shape. In the illustrated example, the bore basket inlet 82, the bore basket outlet 86, and the anti-vortex cavity outlet 112 each include a plurality of circular openings surrounding a circumference of the bore basket 62. However, other shaped openings could be used in place of or in addition to the circular openings. Moreover, the bore basket outlet 86 includes a greater number of openings having a smaller opening area than the bore basket inlet 82.

Furthermore, the anti-vortex cavity outlet 112 includes fewer openings having a larger opening area than the bore basket inlet 82.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A high pressure compressor rotor stack comprising:
  a bore basket including a bore basket internal passage including an inlet downstream of an outlet;
  a first plurality of rotor stages at least partially defining a forward rotor bore with a forward hub structure and the bore basket and a fluid inlet to the forward rotor bore extending through the forward hub structure; and
  a second plurality of rotor stages at least partially defining an aft rotor bore with an aft hub structure and the bore basket.

2. The high pressure compressor rotor stack of claim 1, wherein the outlet to the bore basket internal passage is in fluid communication with a fluid outlet extending through the forward hub structure and the fluid outlet in the forward hub structure is located radially inward and axially forward of the fluid inlet to the forward rotor bore.

3. The high pressure compressor rotor stack of claim 1, further comprising a fluid inlet to the aft rotor bore extending through the aft rotor structure and a fluid outlet to the aft rotor bore located adjacent the second plurality of rotor stages.

4. The high pressure compressor rotor stack of claim 3, wherein the fluid outlet to the aft rotor bore is located axially upstream and radially outward of the fluid inlet to the aft rotor bore.

5. The high pressure compressor rotor stack of claim 1, further comprising an anti-vortex cavity located axially between the forward rotor bore and the aft rotor bore.

6. The high pressure compressor rotor stack of claim 5, wherein an upstream end of the anti-vortex cavity is defined by one of the first plurality of rotor stages, a downstream end of the anti-vortex cavity is defined by one of the second plurality of rotor stages, and a radially inner edge of the anti-vortex cavity is defined by a portion of the bore basket.

7. The high pressure compressor rotor stack of claim 6, wherein a forward seal fluidly seals the one of the first plurality of rotor stages to the bore basket and an aft seal fluidly seals the one of the second plurality of rotor stages to the bore basket to fluidly separate the anti-vortex cavity from the forward rotor bore and the aft rotor bore.

8. The high pressure compressor rotor stack of claim 1, wherein at least a portion of the forward hub structure includes a cone shape opening in a downstream direction and at least a portion of the aft hub structure includes a cone shape opening in an upstream direction.

9. A gas turbine engine comprising:
  a turbine section;
  a compressor section driven by the turbine section, wherein the compressor section includes a high pressure compressor rotor stack having:
    a bore basket including a bore basket internal passage located within a thickness of a wall of the bore basket;
    a first plurality of rotor stages at least partially defining a forward rotor bore with a forward hub structure and the bore basket; and
    a second plurality of rotor stages at least partially defining an aft rotor bore with an aft hub structure and the bore basket.

10. The high pressure compressor rotor stack of claim 9, further comprising a fluid inlet to the forward rotor bore extending through the forward hub structure, wherein the fluid inlet is in fluid communication with a core flow path of the gas turbine engine.

11. The high pressure compressor rotor stack of claim 10, wherein the bore basket internal passage includes an inlet downstream of an outlet and the outlet to the bore basket internal passage is in fluid communication with a fluid outlet extending through the forward hub structure and the fluid outlet is in fluid communication with a bearing support cavity.

12. The high pressure compressor rotor stack of claim 9, further comprising a fluid inlet to the aft rotor bore extending through the aft hub structure and a fluid outlet to the aft rotor bore located adjacent the second plurality of rotor stages.

13. The high pressure compressor rotor stack of claim 9, further comprising an anti-vortex cavity located axially between the forward rotor bore and the aft rotor bore, wherein an upstream end of the anti-vortex cavity is defined by one of the first plurality of rotor stages, a downstream end of the anti-vortex cavity is defined by one of the second plurality of rotor stages, and a radially inner edge of the anti-vortex cavity is defined by a portion of the bore basket.

14. The high pressure compressor rotor stack of claim 13, wherein a forward seal fluidly seals the one of the first plurality of rotor stages to the bore basket and an aft seal fluidly seals the one of the second plurality of rotor stages to the bore basket to fluidly separate the anti-vortex cavity from the forward rotor bore and the aft rotor bore.

15. A method of directing fluid through a high pressure turbine rotor stack comprising the steps of:
  directing a first fluid through a forward rotor bore, wherein a fluid inlet to the forward rotor bore extends through a forward hub structure and an outlet of the forward rotor bore is in fluid communication with a bearing compartment;
  directing a second fluid through an anti-vortex cavity; and
  directing a third fluid through an aft rotor bore in an aft hub structure in an upstream direction.

16. The method of claim 15, further comprising heating at least one forward rotor disk in the forward rotor bore with the first fluid entering the forward rotor bore and controlling an amount of flow of the first fluid by varying a radial dimension between a radially inner end of the at least one rotor disk and a bore basket.

17. The method of claim 16, further comprising conditioning at least one aft rotor disk in the aft rotor bore with the third fluid and controlling an amount of flow of the third fluid by varying a radial dimension between a radially inner end of the at least one aft rotor disk and the bore basket.

18. The method of claim 17, further comprising fluidly isolating the forward rotor bore from the anti-vortex cavity with a forward seal engaging a bore basket and fluidly isolating the aft rotor bore form the anti-vortex cavity with an aft seal engaging the bore basket.

19. The high pressure compressor rotor stack of claim 1, wherein the bore basket internal passage is located radially outward from a radially inner surface of the bore basket.

20. The method of claim 16, wherein the first fluid is directed through a bore basket internal passage in a bore basket and the bore basket internal passage is located radially outward from a radially inner surface of the bore basket.

* * * * *